Oct. 26, 1965 R. F. SCHWERDT, JR., ETAL 3,214,596
PHOTOELECTRIC SENSOR STRUCTURE INCLUDING
LIGHT SOURCE AND INCLINED LENS
Filed Oct. 31, 1962
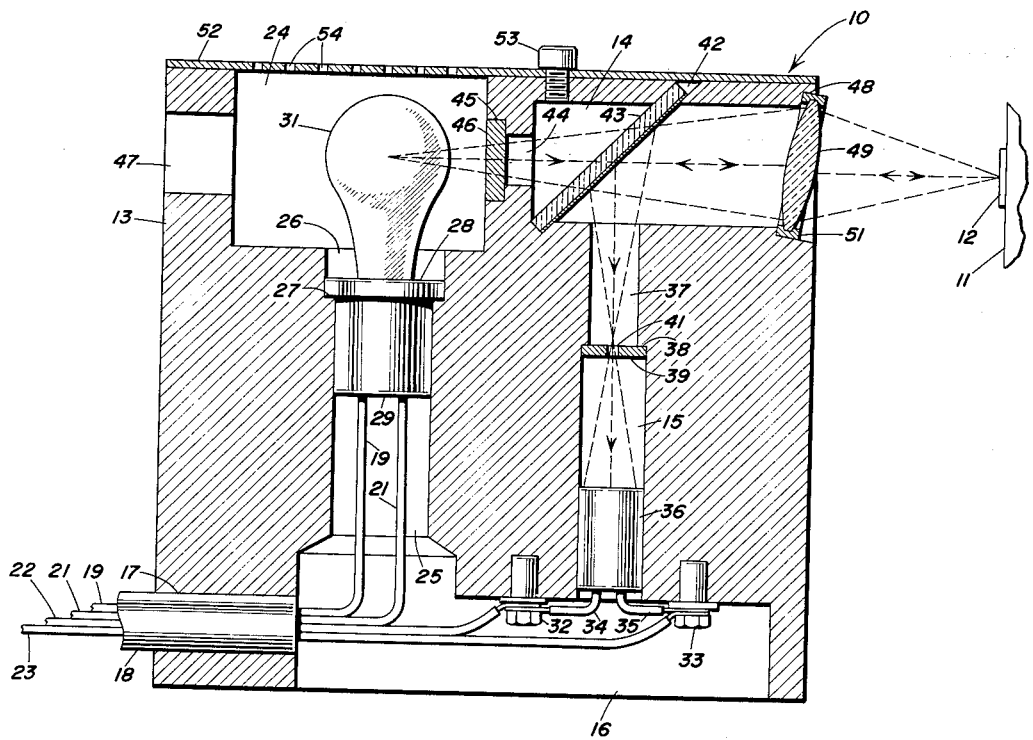
RUDOLPH F. SCHWERDT, JR.
RICHARD J. SWEET
INVENTORS
BY Norman S. Blodgett
ATTORNEY

United States Patent Office 3,214,596
Patented Oct. 26, 1965

3,214,596
PHOTOELECTRIC SENSOR STRUCTURE INCLUDING LIGHT SOURCE AND INCLINED LENS
Rudolph F. Schwerdt, Jr., Long Branch, N.J., and Richard J. Sweet, Northboro, Mass., assignors to Machinery Electrification, Inc., Northboro, Mass., a corporation of Massachusetts
Filed Oct. 31, 1962, Ser. No. 234,399
1 Claim. (Cl. 250—239)

This invention relates to a photoelectric sensor and more particularly to apparatus arranged to indicate the presence or non-presence of reflective materials.

In the handling of articles in an automatic warehouse or the like, it is common practice to code the articles by means of retro-reflective material. A method of coding articles in this way is described in the co-pending application of Dunigan and Schwerdt, Serial Number 196,401, filed May 21, 1962. According to this procedure, a sensor or scanner is used which directs a beam of light in the area where a coded article may pass. When an article which has been supplied with retro-reflective material passes this sensor the light is reflected backwardly into the sensor and the sensor indicates this reflection by an increase in electrical signal. To operate electrical equipment effectively, however, the ratio between this indicating signal and the non-indicating signal (which may be thought of as "noise") must be very high. Such sensors which have been manufactured in the past have such high levels of background "noise" that it is difficult to differentiate between it and the signal indicating the presence of the retro-reflective material. These and other difficulties have been obviated in a novel manner by the present invention.

It is, therefore, an outstanding object of the present invention to provide a photoelectric sensor in which the ratio between indicating signal and non-indicating signal is very high.

Another object of this invention is the provision of a photoelectric sensor for indicating the presence or non-presence of retro-reflective material in which the ratio of signal to noise is very high.

A further object of the present invention is the provision of a photoelectric sensor in which, to a very great extent, the only light reaching the photoelectric cell is that light which is returned from a reflective surface.

With these and other objects in view, as will be apparent to those skilled in the art, the invention resides in the combination of parts set forth in the specification and covered by the claim appended hereto.

The character of the invention, however, may be best understood by reference to one of its structural forms as illustrated by the accompanying drawing in which:

The single figure shows a vertical sectional view of a photoelectric sensor embodying the principles of the present invention.

The photoelectric sensor, indicated by the reference numeral 10, is shown in use with an article 11 carrying a code marker 12 of retro-reflective material. The marker 12 consists of a plastic sheet having pressure-sensitive adhesive on the back surface. On the front surface is mounted a coating of transparent glass bead microspheres which serve as minute sphere-lenses and have a refractive index ($N_d$) of approximately 1.9. Each sphere is capped on its back extremity (away from the viewer) with a specularly-reflecting hemispherical film or layer. The diameters of the glass bead microspheres used in the material are in the range from 25 to 75 microns.

The sensor or scanner is provided with a solid metal body 13 having a main passage 14 and a secondary passage 15 extending at a right angle to the main passage. Formed in the lower port of the body 13 is a recess 16 into which extends a horizontal bore 17 through which enters a conduit 18 which carries four wires 19, 21, 22, and 23. In the upper part of the body 13 is located a rectilinear recess 24; a vertical bore 25 extends between the recess 24 and the recess 16. The bore 25 is provided with a counter-bore 26 resulting in a shoulder 27 on which rests a flange 28 of a lamp socket 29. The lamp socket carries a light source such as an incandescent lamp 31 and is connected to the wires 19 and 21 which, at their outer ends, are connected to a source of electrical power (not shown). In the recess 16 are mounted binding posts 32 and 33 to which the wires 22 and 23, respectively, are connected. From these posts extend leads 34 and 35 which are connected at their other ends to a photoelectric cell 36 mounted in the lower part of the secondary passage 15. The secondary passage is provided with an upper reduced portion 37, there being a shoulder 38 between the two parts of the passage against which is cemented a disk 39 which operates as a wall and which has a small aperture 41 formed centrally thereof. The main passage 14 has a circular cross-section and opens into the side of the body 13 which faces toward the article 11. A thin slot 42 extends entirely across the passage at a substantial angle thereto and in this slot is mounted a beam splitter such as a partial mirror 43 of the well-known type. The mirror is provided with a thin layer of silver reflective material which, in fact, is thin enough so that it will permit light to pass through it and which, at the same time, may also reflect a quantity of light. At the rear of the passage 14 it merges into a reduced portion 44 extending into the side of the recess 24. The reduced portion is provided with a counterbore 45 in which is mounted a glass plate 46. At the opposite side of the recess 24 and in line with and coaxial with the main passage 14 is a bore 47. It will be understood, of course, that the incandescent lamp 31 will be located so that the center of light source will be in alignment with and coaxial with the main passage 14. At its outer end the main passage 14 is provided with a counterbore 48 whose axis is slightly inclined to the axis of the main passage 14. In this counterbore is mounted a coated lens 49 locked in place by a retaining ring 51. All surfaces in the body 13 and particularly those of the main passage 14 and the secondary passage 15 are finished or painted with a dull black non-reflective coating. A metal cover 52 overlies the top surfaces of the body and encloses the recess 42 and is held in place by a cap screw 53. The portions of the cover 54 in the vicinity of the incandescent lamp 31 are provided with apertures 54 for the release of heat.

The operation of this invention will now be readily understood in view of the above description. The incandescent lamp 31 is illuminated by the provision of electrical current through the wires 19 and 21. The wires 22 and 23 are connected to instruments which will make use of the signal from the photoelectric cell 36 such as by controlling an automatic conveyor system. The light from the lamp 31 passes through the glass plate 46 along the reduced portion 44 into the main passage 14 on a line which is substantially coaxial thereof. The light passes through the mirror 43 and strikes the lens 49. It passes through the lens and is focused on the element 11. If there is no retro-reflective material present at that part of the element 11 on which the light is focused, there will be little or no return of light to the lens 49. If, however, there is a marker 12 of retro-reflective material, the light will be reflected in a brilliant ray back to the lens 49. It will be understood that ordinary reflective materials will reflect light to a certain extent, but the light is broadcast in all directions, but more particularly at an angle of reflection which is equal to the angle of incidence. Retro-reflective materials, on the other hand, return light in exactly the direction that the light arrives with very little dispersion. This light, therefore, passes through the lens 49 and strikes the mirror 43. Depending upon the amount of silvering on the partial mirror 43 some of the light will pass through and some will be reflected downwardly into the secondary passage 15. The light passes through the reduced portion 37, through the aperture 41 of the disk 39, and eventually impinges on the photocell 36 to give a signal in the leads 34 and 35 and the wires 22 and 23 indicative of the fact that retro-reflective material exists on the article 11. The location of the disk 39 and the aperture 41 is selected at the focal point of the lens 49 in combination with the mirror 43.

It is most desirable that the light which arrives at the photocell 36 be only that light which has been reflected from the retro-reflective marker 12. For instance, even when no retro-reflective material is in line with the lens 49, the general lighting of the room in which the scanner is placed will enter the lens 49 and be reflected down the secondary passage 15 to strike the photocell 36. Another source of stray light is the light which leaves the lamp 31, passes through the mirror 43 and is reflected rearwardly by the highly polished rear surface of the lens 49. This light is scattered but is reflected from the front surface of the mirror 43 and from the walls of the main passage 14 and so on into the secondary passage 15. To reduce this stray light and prevent it from being reflected into the secondary passage, the main passage 14 and the secondary passage are coated with a dull black non-reflective paint. Another way in which this stray light is prevented from reaching the photocell is by inclining the axis of symmetry of the lens 49 downward slightly from the axis of the passage 14. This has the effect of causing the light reflected from the back surface of the lens to take a different path from the light which is passing from the lamp 31 and this light is absorbed by the black walls of the passage and does not reach the secondary passage. By placing the aperture 41 at the focal point of the lens 49 in the secondary passage 15, the additional sources of stray light are reduced and the only light that is able to pass through the aperture 41 is that returning light which has been focused by the lens 49 and reflected from the mirror 43.

The photoelectric cell 36 may be of the type in which the resistance increases in darkness and decreases in the presence of light. Now, if a prior art sensor observes two surfaces, one containing a retro-reflective material and one a non-reflecting surface, we may find that the resistance of the photocell when scanning the retro-reflective material is 1/10 that when scanning the non-reflecting surface under exactly the same conditions of distance and ambient light. We can say, therefore, that there is a signal-to-noise ratio of 10 to 1. Obviously, any increase in the signal-to-noise ratio would enhance the performance of the sensor. The sources of noise are obviously any stray light which reaches the photocell. One way to greatly reduce the source of noise is to restrict the photocell so that it does not "see" the entire surface of the beam splitter or mirror 43. The way the applicant accomplishes this is to place the minute aperture at the focal point of the lens and to place the photocell in back of the focal point. By so doing we allow the photocell to receive light only through this small aperture. Therefore, when stray light is illuminating the mirror only that amount of light which can pass through the minute aperture will impinge on the photocell. However, when the bright image of the filament is returned through the lens by the retro-reflective material, the image will be focused through the aperture and fall on the photocell. In the same way, improvements in the signal-noise ratio can be made by reducing the amount of the reflected and refracted light reaching the photocell from internal reflection from the mirror and the body of the scanning device itself. To accomplish this improvement we use low-reflective coatings on the important parts of the surfaces of the passages. In a commercial embodiment of the invention the signal-noise ratio was dramatically improved from the 10 to 1 of the prior art to 1,000 to 1. It should be noted that the minute aperture 41 is selected to be exactly the size of the focused image and placed at the focal point of the lens. The tilting of the lens also has the further effect of reducing light originating in the lamp 31 and which is reflected rearwardly from the back surface of the lens 49. This light is reflected (because of the angularity) to areas of the passages where it is absorbed and is not reflected downwardly into the secondary passage 15.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

A photoelectric sensor, comprising
(a) a housing having a main passage extending therethrough and having an elongated narrow secondary passage intersecting the main passage at a right angle thereto, the surfaces of the passages being finished with a non-reflecting finish,
(b) a light source located at one end of the main passage,
(c) a lens located at the other end of the main passage, the axis of symmetry of the lens lying at a small angle to the centerline of the main passage,
(d) a partially-reflecting mirror located in the main passage between the light source and the lens, the mirror being capable of permitting the passage of light from the source to the lens and of causing deflection into the secondary passage of light passing from the lens in the direction of the source,
(e) a photoelectric cell located in the secondary passage, and
(f) a wall with a small aperture located in the secondary passage between the cell and the mirror.

References Cited by the Examiner
UNITED STATES PATENTS

| | | | |
|---|---|---|---|
| 1,934,698 | 11/33 | Cameron | 88—57 |
| 2,226,677 | 12/40 | Vikhman | 250—239 X |
| 2,472,380 | 6/49 | Long | 250—239 X |
| 2,621,300 | 12/52 | King | 250—239 X |
| 2,665,388 | 1/54 | Bickley | 250—239 X |
| 2,795,996 | 6/57 | Sauer | 88—57 |
| 2,920,209 | 1/60 | Asten | 250—239 |
| 3,037,888 | 6/62 | Lobosco et al. | 250—216 X |
| 3,091,693 | 5/63 | Rudomanki et al. | 250—83.3 |
| 3,099,750 | 7/63 | Swarthout et al. | 250—239 |
| 3,145,291 | 8/64 | Brainerd | 250—219 |

RALPH G. NILSON, *Primary Examiner.*
ARCHIE R. BORCHELT, *Examiner.*